(12) United States Patent
Umeno et al.

(10) Patent No.: US 10,924,199 B2
(45) Date of Patent: Feb. 16, 2021

(54) COMMUNICATION METHOD AND COMMUNICATION DEVICE

(71) Applicant: Kyoto University, Kyoto (JP)

(72) Inventors: Ken Umeno, Kyoto (JP); Hirofumi Tsuda, Kyoto (JP)

(73) Assignee: Kyoto University, Kyoto (JP)

( * ) Notice: Subject to any disclaimer, the term of this patent is extended or adjusted under 35 U.S.C. 154(b) by 359 days.

(21) Appl. No.: 15/771,149

(22) PCT Filed: Oct. 28, 2016

(86) PCT No.: PCT/JP2016/082121
§ 371 (c)(1),
(2) Date: Sep. 18, 2018

(87) PCT Pub. No.: WO2017/073750
PCT Pub. Date: May 4, 2017

(65) Prior Publication Data
US 2019/0036635 A1   Jan. 31, 2019

(30) Foreign Application Priority Data
Oct. 30, 2015   (JP) ................. 2015-215003

(51) Int. Cl.
*H04J 13/00* (2011.01)
*H04J 13/16* (2011.01)
(Continued)

(52) U.S. Cl.
CPC .......... *H04J 13/0051* (2013.01); *H04B 1/707* (2013.01); *H04J 13/0003* (2013.01);
(Continued)

(58) Field of Classification Search
CPC combination set(s) only.
See application file for complete search history.

(56) References Cited

U.S. PATENT DOCUMENTS

| 5,136,611 A * | 8/1992 | Kirimoto | .............. G01S 13/325 342/195 |
| 5,159,608 A * | 10/1992 | Falconer | .............. H03M 13/23 375/130 |

(Continued)

FOREIGN PATENT DOCUMENTS

JP   2010-28668   2/2010

OTHER PUBLICATIONS

International Search Report dated Dec. 6, 2016 issued in corresponding PCT/JP2016/082121 application (2 pages).
(Continued)

*Primary Examiner* — Yee F Lam
(74) *Attorney, Agent, or Firm* — Millen, White, Zelano & Branigan, P.C.; William Nixon

(57) ABSTRACT

The communication method using an almost periodic function code includes using, for modulation, almost periodic function codes the number of which is in accordance with the number of users or the number of channels, among K almost periodic function codes. Where k is an integer from 1 to K and is an identifier for identifying each of the K almost periodic function codes, a parameter that determines each of the K almost periodic function codes is represented by δ+(k−1)/K. The symbol K is N or 2N, where N is a code length of each almost periodic function code. The symbol δ is a real number greater than 0 and less than 1/N.

13 Claims, 5 Drawing Sheets

(51) Int. Cl.
*H04J 13/10* (2011.01)
*H04J 13/12* (2011.01)
*H04B 1/707* (2011.01)

(52) U.S. Cl.
CPC .......... *H04J 13/0074* (2013.01); *H04J 13/10* (2013.01); *H04J 13/12* (2013.01); *H04J 13/16* (2013.01)

(56) References Cited

U.S. PATENT DOCUMENTS

| | | | | |
|---|---|---|---|---|
| 2006/0147219 A1* | 7/2006 | Yoshino | ................ | H04J 14/007 398/183 |
| 2006/0208939 A1* | 9/2006 | Nagai | ................... | H03J 1/0008 342/42 |
| 2006/0291589 A1* | 12/2006 | Eliezer | ..................... | H03C 3/40 375/302 |
| 2007/0237258 A1* | 10/2007 | Shakeshaft | .............. | H03C 5/00 375/296 |
| 2007/0280579 A1* | 12/2007 | Li | ......................... | G02F 1/0356 385/3 |
| 2013/0038479 A1* | 2/2013 | Eldar | .................... | H03M 1/121 341/122 |
| 2015/0120241 A1* | 4/2015 | Kadambi | ................ | G01S 17/32 702/166 |
| 2016/0241985 A1* | 8/2016 | Fukue | ..................... | H04S 7/301 |
| 2017/0078134 A1* | 3/2017 | Nossek | ..................... | H04B 1/06 |
| 2018/0103475 A1* | 4/2018 | Qu | ......................... | H04W 72/04 |

OTHER PUBLICATIONS

English Translation of JP 2010-28668 A published Feb. 4, 2010.

T. Naohara et al. "Performance Analysis of Super Dense Multiple Access (SDMA) Communications Systems Using Almost Periodic Function Codes", IEICE Technical Report, vol. 114, No. 348 (Nov. 26, 2014) pp. 11-16.

H. Tsuda et al., "Weyl Spreading Sequence Optimizing CDMA", IEICE Translations on Communications, vol. E1013-B, No. 3 (Mar. 2018) pp. 897-908.

H. Tsuda et al., "Configuration and Evaluation of Optimum Weyl Codes for CDMA", Proceeding of the Japan Society or Industrial and Applied Mathematics (2015).

K. Umeno, "Spread Spectrum Communications Based on Almost Periodic Functions: Almost Periodic Code Approach Versus Chaotic Code Approach for Communications", IEICE Technical Report, vol. 114, No. 250 (Oct. 3, 2014) pp. 87-90.

* cited by examiner (a)

(b)

COMMUNICATION METHOD AND COMMUNICATION DEVICE

TECHNICAL FIELD

The present invention relates to communication using almost periodic function codes.

BACKGROUND ART

An almost periodic function is obtained by generalizing Fourier series expansion. The almost periodic function is formed as a sum of signals having a frequency that is an m-th prime number p(m) raised to the ½ power, for example. Such signals have not been used in communications conventionally, but Non Patent Literature 1 proposes application thereof to communications for the first time.

Non Patent Literature 1 discloses multiple access communication using codes (almost periodic function codes) based on an almost periodic function. It is noted that, in Non Patent Literature 1, the codes based on an almost periodic function are referred to as almost periodic spreading sequence (APSS).

CITATION LIST

Non Patent Literature

NON PATENT LITERATURE 1: Umeno, Ken, "Spread Spectrum Communications Based on Almost Periodic Functions: Almost Periodic Code Approach versus Chaotic Code Approach for Communications", IEICE technical report, vol. 114, no. 250, NLP2014-64, pp. 87-90 (2014), Institute of Electronics, Information and Communication Engineers

SUMMARY OF INVENTION

Technical Problem

Relevant literature, Tsuda Hiroshi, Umeno Ken, "configuration and evaluation of optimum Weyl codes for CDMA", proceeding of the Japan Society for Industrial and Applied Mathematics (2015), published by the present inventors proposes optimization of almost periodic function codes (Weyl codes) using a Weyl sequence. More specifically, the relevant literature discloses optimization of $\rho_k$ which is a parameter (initial value) that determines a Weyl code for each user. The relevant literature reports that, in a case where the number of users in communication is K, the intervals between the parameters (initial values) $\rho_k$ given to respective users k are set to equal intervals of 1/K, whereby the bit error rate can be reduced.

The almost periodic function code described in the relevant literature is a code using a Weyl sequence which is an irrational number sequence, and therefore, as a premise, the parameter (initial value) $\rho_k$ given to each user is an irrational number.

However, the parameter that determines the almost periodic function code need not be limited to an irrational number. The present invention is based on such conception.

Solution to Problem

One aspect of the present invention is a communication method using an almost periodic function code, the communication method including using, for modulation, almost periodic function codes a number of which is in accordance with a number of users or a number of channels, among K almost periodic function codes. Here, the communication includes broadcasting.

In an embodiment, where k is an integer from 1 to K and is an identifier for identifying each of the K almost periodic function codes, a parameter that determines each of the K almost periodic function codes is represented by $\delta+(k-1)/K$. Here, K is N or 2N, where N is a code length of each almost periodic function code, and preferably, $\delta$ is a real number greater than 0 and less than 1/N.

Preferably, $\delta$ is in a range of $¼N \leq \delta \leq ¾N$, and more preferably, $\delta$ is ½N.

Preferably, $\delta$ is in a range of $⅛N \leq \delta \leq ⅜N$, and more preferably, $\delta$ is ¼N.

Preferably, $\delta$ is in a range of $⅝N \leq \delta \leq ⅞N$, and more preferably, $\delta$ is ¾N.

Preferably, $\delta$ is a rational number.

Another aspect of the present invention is a communication device performing communication using an almost periodic function code, the communication device including a modulator configured to use, for modulation, almost periodic function codes a number of which is in accordance with a number of users or a number of channels, among K almost periodic function codes.

DESCRIPTION OF EMBODIMENTS

[1. Outline of Communication Device]

Figure 1:
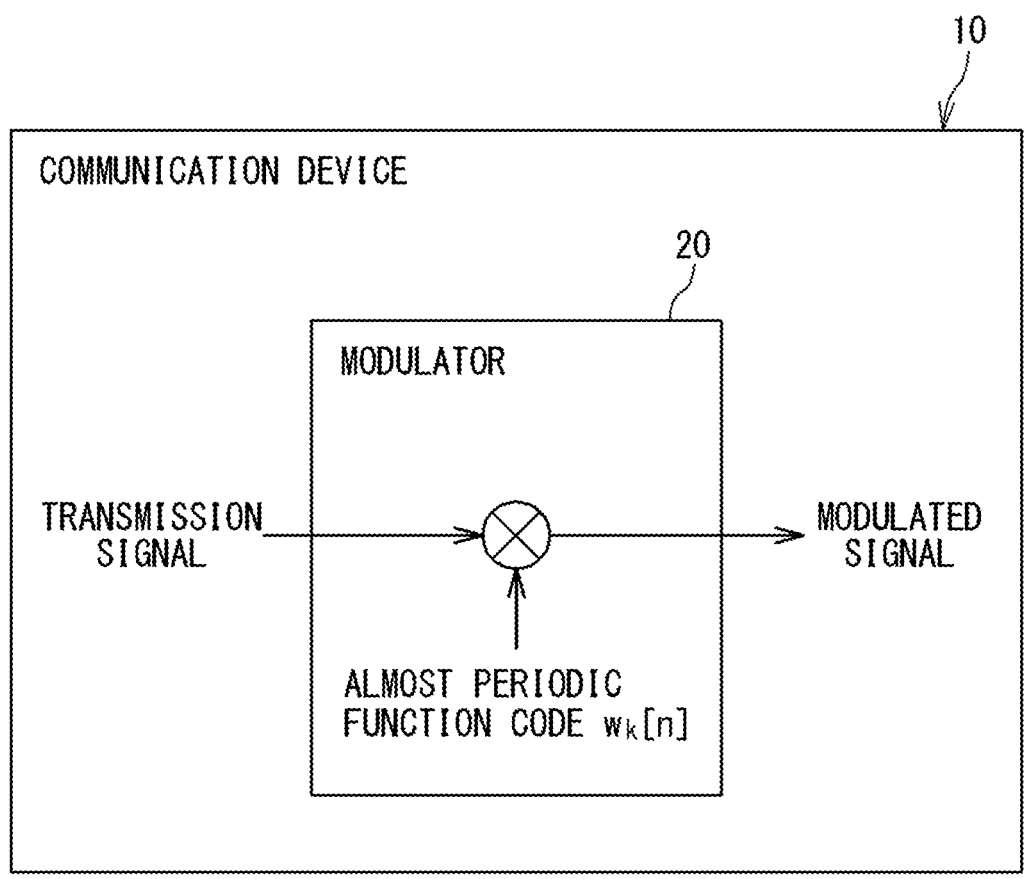
FIG. 1 is a block diagram showing a communication device.

Hereinafter, embodiments will be described with reference to the drawings. FIG. 1 shows a communication device 10 for spread spectrum communication using almost periodic function codes. The communication device 10 includes a modulator 20 for modulating a transmission signal. The modulator 20 outputs a modulated signal by multiplying a transmission signal with an almost periodic function code. Transmission data may be subjected to primary modulation such as BPSK, QPSK, or 16QAM. The modulated signal outputted from the modulator 20 is received by another communication device through a signal transmission path and modulated.

[2. Almost Periodic Function Code]

An almost periodic function code $w_k[n]$ is represented by the following expression (1).

[Mathematical 1]

$$w_k[n] = \exp(2\pi i \times n \times \rho_k) \quad (1)$$

Here, the symbol k is an identifier for code and is an integer from 1 to K ($1 \leq k \leq K$). The symbol K is the number of users or the number of channels. The symbol k is also used as an identifier for a user or a channel to which the code $w_k[n]$ is assigned.

The symbol n is an identifier for an element included in a code and is an integer from 1 to N ($1 \leq n \leq N$). The symbol N is a code length.

The symbol i is the imaginary unit.

The symbol $\rho_k$ is a parameter (initial value) that determines the code $w_k[n]$, and takes different values for respective codes $w_k[n]$.

Figure 2:
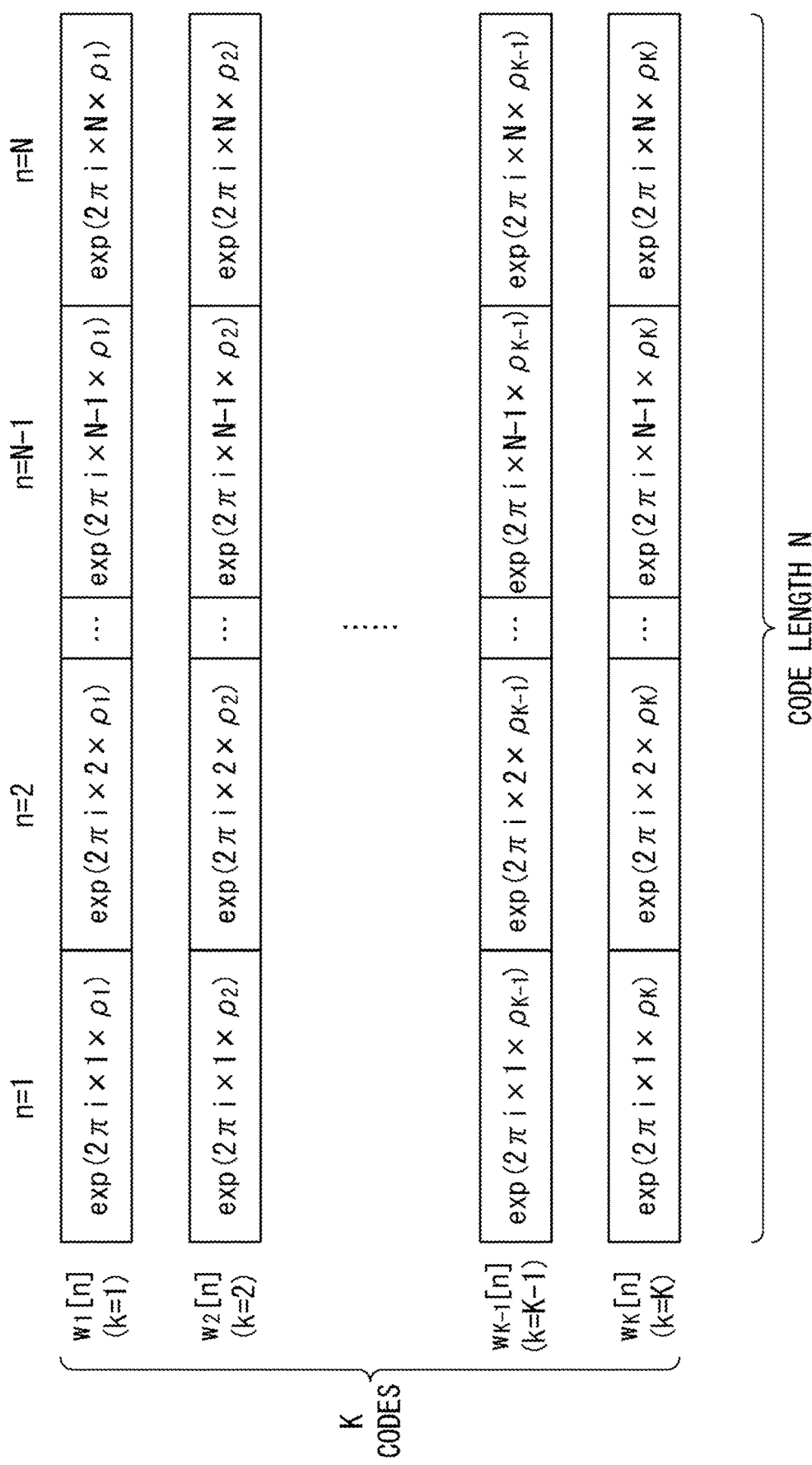
FIG. 2 is a diagram showing K almost periodic function codes.

FIG. 2 shows the codes $w_k[n]$ represented by expression (1). FIG. 2 shows K codes (code sequence) $w_k[n]$ having a code length N. Each code $w_k[n]$ has N elements. As is obvious from expression (1) and FIG. 2, the value of the code $w_k[n]$ is determined by the parameter $\rho_k$.

The Weyl code (see Non Patent Literature 1 and the relevant literature) using a Weyl sequence is obtained by using a Weyl sequence $x_k[n]$ represented by expression (2) as $n \times \rho_k$ in expression (1). The Weyl sequence is quasi-random numbers and is based on Weyl's uniform distribution theorem that the fractional part of an integer multiple of an irrational number is uniformly distributed in an interval [0,1).

[Mathematical 2]

$$x_k[n] = \sqrt{p_k} \times n \pmod{1} \qquad (2)$$

Here, the symbol $p_k$ is a prime number assigned to the user k.

The relevant literature discloses optimization of the parameter $\rho_k$ assigned to the user k, in the Weyl code. In the relevant literature, the new Weyl code optimized is represented by the following expression (3).

[Mathematical 3]

$$w_k[n] = \exp\left(2\pi i n\left(\delta + \frac{k-1}{K}\right)\right) \qquad (3)$$

Here, the symbol $\delta$ is an irrational number included in an interval not less than 0 but less than 1 ($0 \leq \delta < 1$).

In expression (3), $(\delta + (k-1)/K)$ corresponds to $\rho_k$ in expression (1). That is, $\rho_k = (\delta + (k-1)/K)$ is satisfied. Expression (3) means that, in a case where the number of users in communication is K, the interval between the parameters (initial values) $\rho_k$ given to the respective users k is set to equal intervals of 1/K. As reported by the relevant literature, the Weyl code of expression (3) allows optimization of cross-correlation value, leading to reduction in the bit error rate. It is noted that $\delta$ is equal to the parameter $\rho_k$ assigned to the user of k=1. In the relevant literature, the symbol K indicates the number of users, but may indicate the number of channels.

Expression (3) is based on the premise that the Weyl sequence which is an irrational number sequence is used, and therefore, in the relevant literature, $\delta$ is defined as an irrational number as described above. If $\delta$ is an irrational number, $\rho_k$ is also an irrational number. If $\rho_k$ is an irrational number, the uniform distribution theorem is satisfied even when the code length N is infinity.

However, in a case of using the Weyl sequence for communication, the code length N is a finite length. Therefore, it is sufficient that $n \times (\delta + (k-1)K)$ in expression (3) is discretely and uniformly distributed when n takes values up to the code length N. Accordingly, in a case of using the Weyl sequence for communication, the uniform distribution theorem need not be satisfied in an exact sense. Since the uniform distribution theorem need not be satisfied, $\delta$ in expression (3) need not be an irrational number, but may be a rational number. Therefore, $\delta$ in expression (3) can be extended to a real number including a rational number. In addition, even if $\delta$ in expression (3) is defined as an irrational number, $\delta$ is treated as a rational number in a process by a computer. Therefore, it is practical to define $\delta$ as a real number.

The new Weyl code extended is represented by expression (1) in which the parameter (initial value) $\rho_k$ is defined as shown by the following expression (4).

[Mathematical 4]

$$\rho_k = \delta + \frac{k-1}{K} \qquad (4)$$

Here, the symbol $\delta$ is a real number not less than 0 but less than 1 ($0 \leq \delta < 1$).

Since $\delta$ is a real number, the parameter $\rho_k$ in expression (4) also becomes a real number. If $\rho_k$ is extended to a real number as shown in expression (4), it becomes easy to determine a more preferable value of $\rho_k$. The present inventors have found a more appropriate parameter $\rho_k$ in consideration of the autocorrelation value of the code $w_k[n]$, while extending $\rho_k$ to a real number. It is noted that the autocorrelation value of the code $w_k[n]$ is an index used when the communication device that has received a modulated signal searches for a start position of the code $w_k[n]$ in the received signal.

In a case where the parameter $\rho_k$ is a real number, the autocorrelation value of the code $w_k[n]$ in expression (1) is represented by the following expression (5). In expression (5), the symbol l ($0 \leq l \leq N$) is the shift amount of the code.

[Mathematical 5]

$$\frac{1}{N}\sum_{n=1}^{N-l} \exp(2\pi i(n+l)\rho_k)\exp(-2\pi i n \rho_k) + \qquad (5)$$

$$\frac{1}{N}\sum_{n=1}^{l} \exp(2\pi i n \rho_k)\exp(-2\pi i(N-l+n)\rho_k)$$

By arranging expression (5), the following expression (6) is obtained.

[Mathematical 6]

$$= \frac{1}{N}\sum_{n=1}^{N-l} \exp(2\pi i l \rho_k) + \frac{1}{N}\sum_{n=1}^{l} \exp(-2\pi i(N-l)\rho_k) \qquad (6)$$

The autocorrelation value does not depend on the variable n, and therefore expression (6) can be deformed into expression (7).

[Mathematical 7]

$$= \frac{N-l}{N}\exp(2\pi i l \rho_k) + \frac{1}{N}\exp(-2\pi i(N-l)\rho_k) \qquad (7)$$

The magnitude of the autocorrelation value is represented by the following expression (8) on the basis of expression (7).

[Mathematical 8]

$$\sqrt{\left(\frac{N-l}{N}\right)^2 + \left(\frac{l}{N}\right)^2 + \frac{2l(N-l)}{N^2}\cos(2\pi N\rho_k)} \quad (8)$$

In order to search for the start position of the code in the received signal, it is desirable that the magnitude of the autocorrelation value is as small as possible. Accordingly, here, the value represented by expression (8) is minimized. The first term and the second term in the radical sign in expression (8) cannot be minimized. Therefore, minimization of expression (8) can be achieved by minimization of $\cos(2\pi N\rho_k)$ included in the third term in the radical sign in expression (8), for example. That is, $\cos(2\pi N\rho_k)$ is made to be always "−1". Therefore, $\cos(2\pi N\rho_k)$ can be minimized by satisfying the following expression (9), using the variable k (k≥1) indicating a user or a channel.

[Mathematical 9]

$$2\pi N\rho_k = \pi + 2(k-1)\pi \quad (9)$$

By solving expression (9) for $\rho_k$, expression (10) is obtained.

[Mathematical 10]

$$\rho_k = \frac{1}{2N} + \frac{k-1}{N} \quad (10)$$

If the parameter $\rho_k$ shown by expression (10) is used as $\rho_k$ in expression (1), the autocorrelation value can be minimized.

Figure 3:
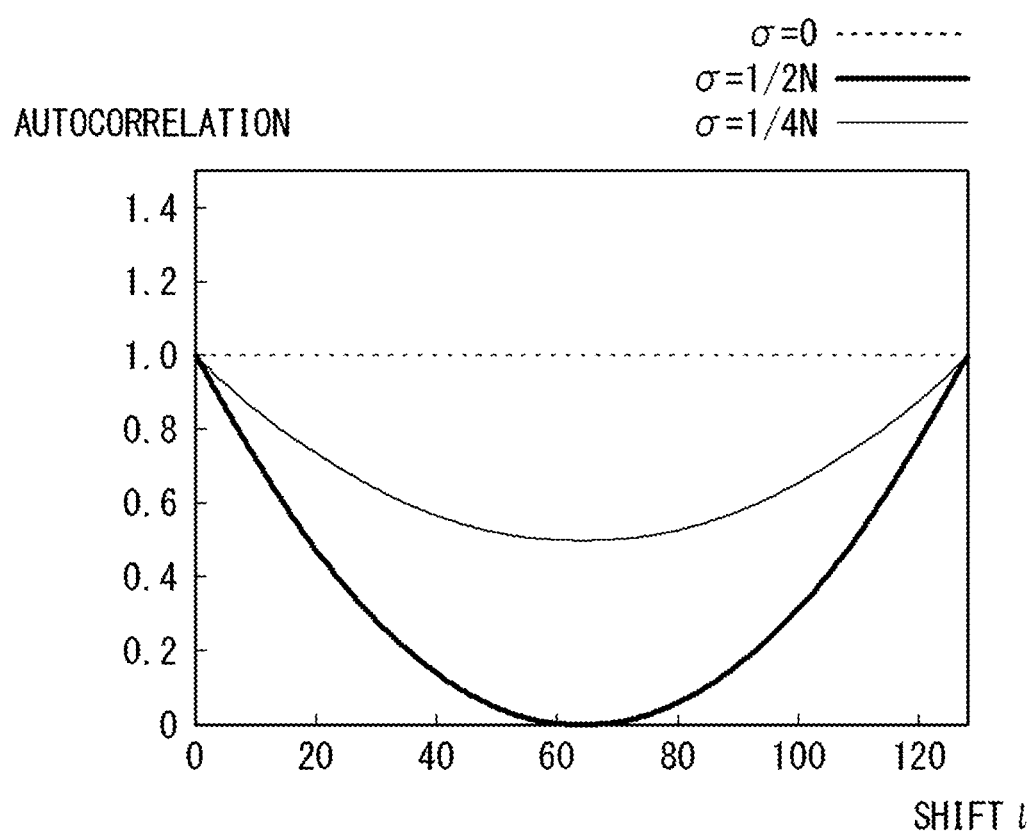
FIG. 3 is a graph showing an autocorrelation value.

Expression (10) corresponds to an expression obtained by setting δ in expression (4) to ½N and setting the number K of users or the number K of channels in expression (4) to the same magnitude as the code length N. FIG. 3 shows the autocorrelation value in a case of setting δ to ½N. In FIG. 3, the horizontal axis indicates a shift l of the code. Here, the code length N is set as N=128, the shift l takes values of 0 to 128. In FIG. 3, the vertical axis indicates the autocorrelation value. As shown in FIG. 3, in a case of δ=½N, it is found that, at the position where the shift l is 64 (shift that is half the code length N=128), the autocorrelation value becomes 0 and the autocorrelation value can be minimized.

In addition, since the second term in expression (10) is (k−1)/N, the intervals between the parameters $\rho_k$ are equal intervals of 1/N. Accordingly, when the number K of users or the number K of channels is the same value as the code length N, expression (10) satisfies expression (4). Therefore, while the maximum value of the number K of users or the number K of channels is limited to the same value as the code length N, if communication is performed using the code $w_k[n]$ obtained by using the parameter $\rho_k$ of expression (10) as $\rho_k$ in expression (1), an effect of reducing the bit error rate is obtained.

Figure 4:
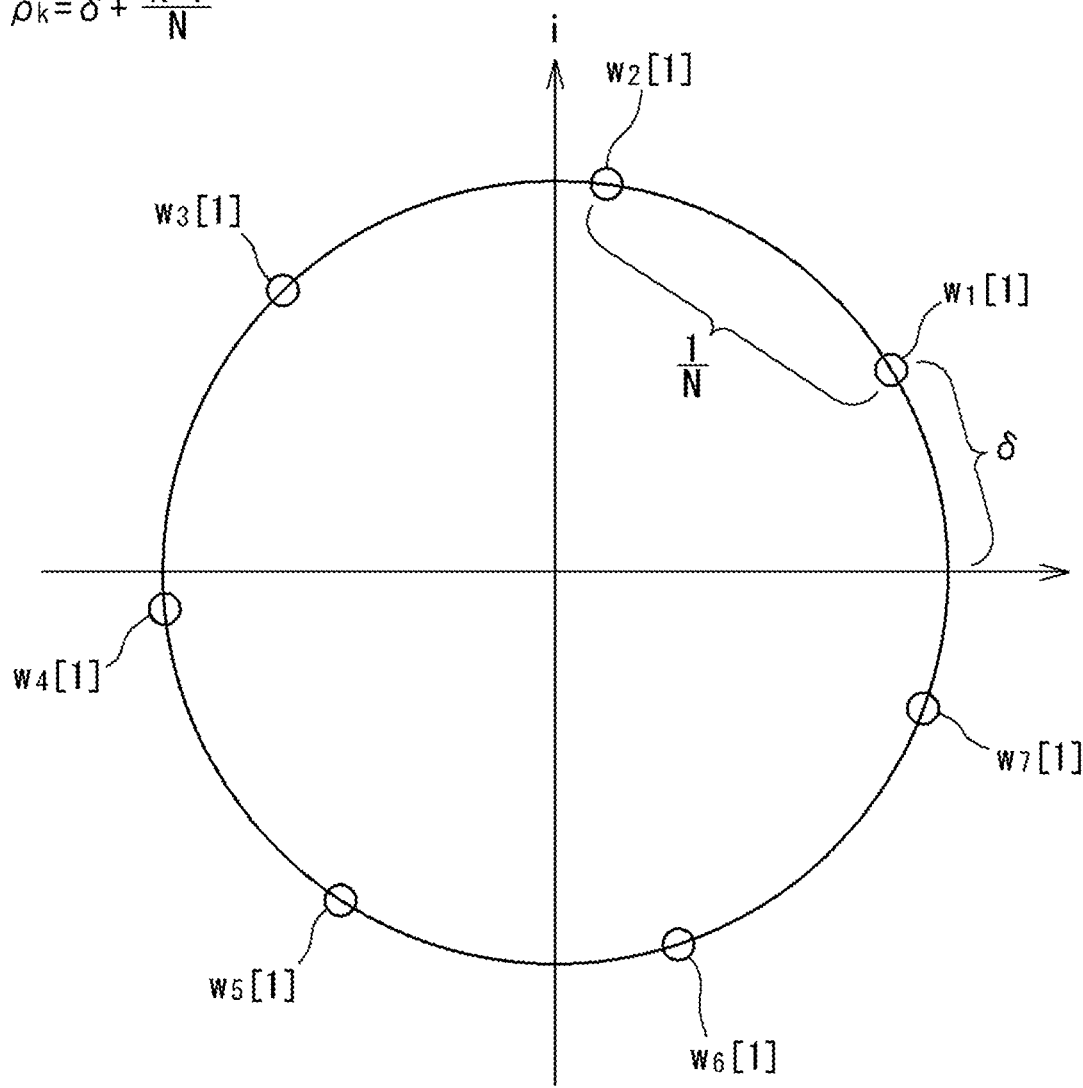
FIG. 4 is a diagram obtained by plotting almost periodic function codes on a complex plane.

FIG. 4 shows first (n=1) elements $w_k[1]$ in the codes $w_k[n]$ using the parameters $\rho_k$ according to expression (10), on a complex plane. Here, a case of K=7, i.e., a case where the number of codes $w_k[n]$ is 7, is shown. Since the intervals between the parameters $\rho_k$ determined in accordance with expression (10) are equal intervals of 1/N, the intervals between the codes $w_k[n]$ are also equal intervals on the complex plane, and discrete uniform distribution is obtained on a circle on the complex plane. In addition, as shown in FIG. 4, δ=½N in expression (10) determines the phase of $w_1[1]$ from the real axis.

It is noted that, since expression (9) is a condition that $\cos(2\pi N\rho_k)$ takes a constant value of "−1" irrespective of the user k or the channel k, a preferable situation (constant autocorrelation value) is obtained in which the autocorrelation value of the code $w_k[n]$ using $\rho_k$ of expression (10) obtained from expression (9) becomes constant irrespective of the user k or the channel k.

Here, it is preferable that the autocorrelation value is minimized, but even if the autocorrelation value is not minimized, it is possible to search for the start position of the code as long as the autocorrelation value is smaller than 1. Therefore, unless minimization of the autocorrelation value is particularly desired, it is possible to relax the condition for the first term (½N) in expression (1) while keeping the second term ((k−1)/N) in expression (10) for obtaining the effect of reducing the bit error rate.

In order to make the autocorrelation value of the code $w_k[n]$ constant irrespective of the user k or the channel k (achieve constant autocorrelation value), $\cos(2\pi N\rho_k)$ in expression (8) is set to have a constant value irrespective of the user k or the channel k. Therefore, it suffices that, when π in expression (9) is generalized by θ (0<θ<2π), θ is a constant not including the variable k.

If π in expression (9) is generalized by θ, the following expression (11) is obtained.

[Mathematical 11]

$$2\pi N\rho_k\theta + 2(k-1)\pi \quad (11)$$

By solving expression (11) for $\rho_k$, expression (12) is obtained.

[Mathematical 12]

$$\rho_k = \frac{\theta}{2\pi N} + \frac{k-1}{N} \quad (12)$$

The second term ((k−1)/N) in expression (12) is the same as the second term in expression (10). In addition, from 0<θ<2π, the range of the first term ((θ/2πN)=δ) in expression (12) is represented by expression (13).

[Mathematical 13]

$$0 < \frac{\theta}{2\pi N} < \frac{1}{N} \quad (13)$$

Therefore, if (θ/2πN) in expression (12) is replaced with δ, the parameter $\rho_k$ is represented by the following expression (14).

[Mathematical 14]

$$\rho_k = \delta + \frac{k-1}{N} \quad (14)$$

Here, δ is a real number greater than 0 and less than 1/N (0<δ<1/N).

The code $w_k[n]$ obtained by using the parameter $\rho_k$ of expression (14) as $\rho_k$ in expression (1) can achieve reduction of the bit error rate and achieve a constant autocorrelation value.

Even though the autocorrelation value of the code $w_k[n]$ is not minimized, it is preferable that the autocorrelation value is as small as possible. From the perspective of causing the autocorrelation value to be a sufficiently small value, e.g., about 0.5, $\cos(2\pi N\rho_k)$ in expression (8) is set to 0 or less. In this case, the range of θ in expression (12) is it/2≤θ≤3/2π. In this case, the range of the first term ((θ/2πN)=δ) in expression (12) is represented by expression (15).

[Mathematical 15]
$$\frac{1}{4N} \leq \frac{\theta}{2\pi N} \leq \frac{3}{4N} \quad (15)$$

Thus, δ (=θ/2πN) is a real number not less than ¼N and not greater than ¾N (¼N≤δ≤¾N). In this case, it is possible to sufficiently reduce the autocorrelation value while achieving reduction of the bit error rate and achieving a constant autocorrelation value. FIG. 3 shows the autocorrelation value in a case of δ=¼N, and it is found that, at the position where the shift 1 is 64 (shift that is half the code length N=128), the autocorrelation value is about 0.5. Also in a case of δ=¾N, the same autocorrelation value as in the case of δ=¼N is obtained. Therefore, in the range of ¼N≤δ≤¾N, the autocorrelation value becomes a value between the autocorrelation value for δ=½N and the autocorrelation value for δ=¼N.

In actual communication, a transmission bit to be subjected to modulation using the code wk[n] takes a value such as "+1" or "-1" according to information to be transmitted. In order to prevent the autocorrelation from varying depending on the value of the transmission bit, it is preferable to set $\cos(2\pi\rho k)$ in expression (8) to be always "0" so that expression (8) has a constant value irrespective of the value of the transmission bit.

The condition that $\cos(2\pi\rho k)$ always becomes "0" is represented by the following expression (16) using the variable k (k≥1) indicating a user or a channel as in expression (9).

[Mathematical 16]
$$2\pi N\rho_k = \frac{\pi}{2} + (k-1)\pi \quad (16)$$

By solving expression (16) for $\rho_k$, expression (17) is obtained.

[Mathematical 17]
$$\rho_k = \frac{1}{4N} + \frac{k-1}{2N} \quad (17)$$

Expression (17) corresponds to an expression obtained by setting δ in expression (4) to ¼N and setting the number K of users or the number K of channels in expression (4) to 2N (twice the code length).

Since the second term in expression (17) is (k−1)/2N, the intervals between the parameters $\rho_k$ are equal intervals of ½N. Thus, the number K of users or the number K of channels may be 2N. However, if the number K of users or the number K of channels increases, the effect of reducing the bit error rate decreases. Therefore, from the perspective of reducing the bit error rate, setting the number K of users or the number K of channels to N is more advantageous. Accordingly, by setting 2N of the second term in expression (17) to N, expression (18) is obtained.

[Mathematical 18]
$$\rho_k = \frac{1}{4N} + \frac{k-1}{N} \quad (18)$$

Expression (18) corresponds to an expression obtained by setting δ in expression (4) to ¼N and setting the number K of users or the number K of channels in expression (4) to the code length N. Thus, the code $w_k[n]$ becomes an orthogonal code.

In addition, in a case where the second term is (k−1)/N as in expression (18), $\cos 2\pi N\rho_k$ can be made 0 even if the first term (¼N) in expression (18) is set to ¾N. Therefore, $\rho_k$ may be a value represented by the following expression (19).

[Mathematical 19]
$$\rho_k = \frac{3}{4N} + \frac{k-1}{N} \quad (19)$$

As described above, δ may be ¼N or ¾N. Here, instead of preventing variation in the autocorrelation, if it is sufficient that variation in the autocorrelation is small, the condition that $\cos(2\pi\rho k)$ in expression (8) is set to be always "0" for deriving expressions (16) to (19) can be relaxed to the condition that $\cos(2\pi\rho k)$ in expression (8) is set to be close to "0". In this case, δ can be set as ⅛N≤δ≤⅜N, or ⅝N≤δ≤⅞N, for example.

[3. Summary Regarding Parameter $\rho_k$]

The code $w_k[n]$ using the parameter $\rho_k$ determined by δ+(k−1)/K enables reduction in the bit error rate. Here, the symbol δ is a real number not less than 0 but less than 1 (0≤δ<1).

In a case of setting the maximum number K of users or the maximum number K of channels to the same value as the code length N (K=N), the parameter $\rho_k$ becomes δ+(k−1)/N. Also in this case, the effect of reducing the bit error rate is obtained. The maximum number K of users or the maximum number K of channels may be set to 2N.

In order to achieve reduction in the bit error rate and achieve a constant autocorrelation value, δ in δ+(k−1)/N is set to a real number greater than 0 and less than 1/N (0<δ<1/N). Preferably, δ is not less than ⅛N (⅛N≤δ), and more preferably, δ is not less than ¼N (¼N≤δ). Preferably, δ is not greater than ⅞N (δ≤⅞N), and more preferably, δ is not greater than ¾N (δ≤¾N). Preferably, δ is not less than ¼N and not greater than ¾N (¼N≤δ≤¾N), and, for example, δ can be set to ½N.

In addition, preferably, δ is not less than ⅛N and not greater than ⅜N (⅛N≤δ≤⅜N), and, for example, δ can be set to ¼N.

In addition, preferably, δ is not less than ⅝N and not greater than ⅞N (⅝N≤δ≤⅞N), and, for example, δ can be set to ¾N.

[4. Bit Error Rate]

Figure 5:
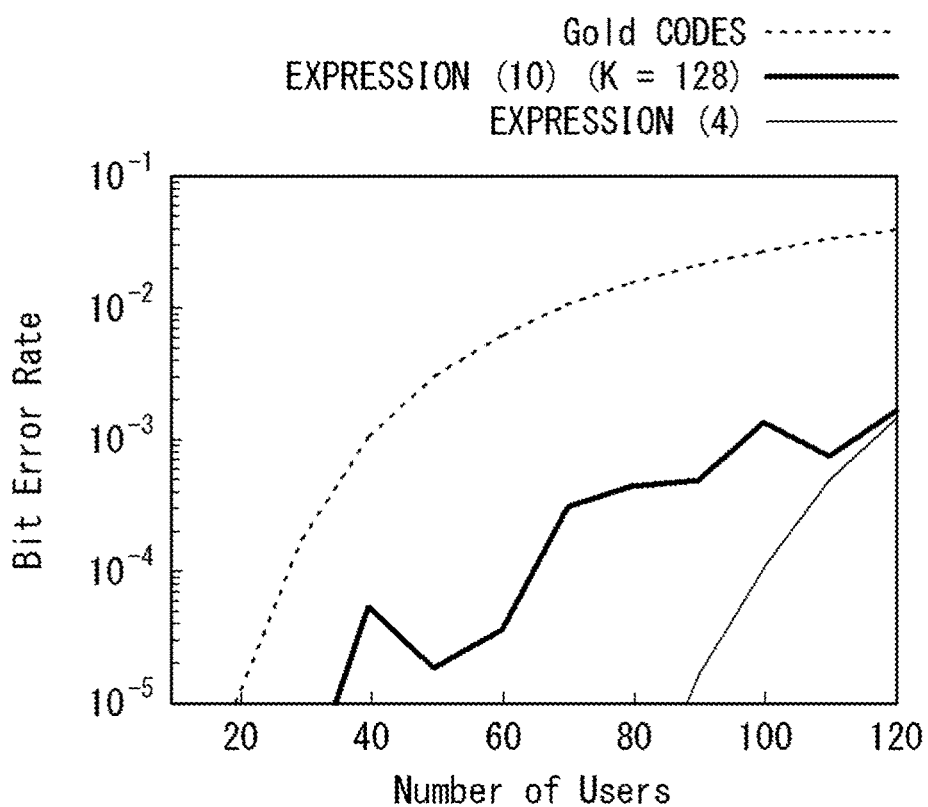
FIG. 5 is graphs showing a result of simulation of bit error rates.
Figure 5:
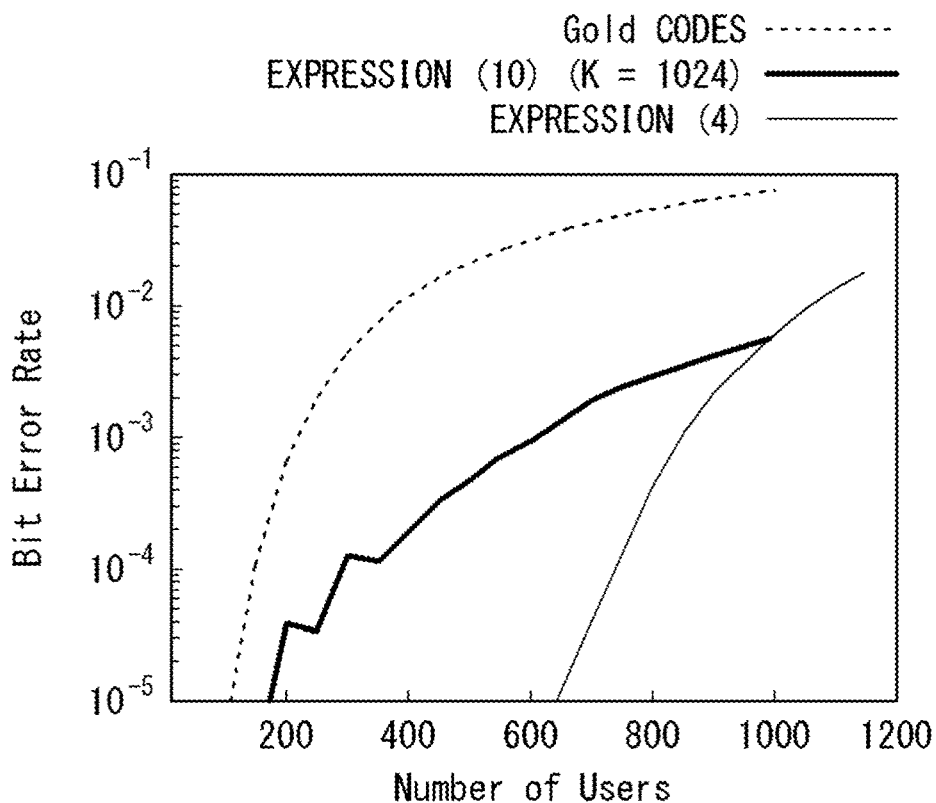

FIG. 5 shows bit error rates in a case of determining the parameter $\rho_k$ in accordance with expression (4) and in a case of determining the parameter $\rho_k$ in accordance with expression (10). In FIG. 5, the horizontal axis indicates the number K of users and the vertical axis indicates the bit error rate.

In FIG. 5, (a) shows the bit error rates in asynchronous spread communication in a case of code length N=127, and (b) shows the bit error rates in chip-synchronization spread communication in a case of code length N=1024.

In the case of determining the parameter $\rho_k$ in accordance with expression (4), since the number K of users is included in expression (4), the parameter $\rho_k$ is optimized per number K of users in accordance with expression (4). On the other hand, in a case of determining the parameter $\rho_k$ in accordance with expression (10), since the number K of users is not included in expression (10), the parameter $\rho_k$ is determined in a unified manner using the code length N=128 irrespective of the number K of users. In FIG. 5, a bit error rate in a case of Gold code is also shown as a comparative example.

In both cases of determining the parameter $\rho_k$ in accordance with expression (4) and determining the parameter $\rho_k$ in accordance with expression (10), the bit error rate reduces as compared to the case of Gold code, and thus an excellent result is obtained. From (a) in FIG. 5, it is found that, in the case of determining the parameter $\rho_k$ in accordance with expression (10), when the number K of users is equal to the code length N=128 or is close thereto, a bit error rate similar to that in the case of determining the parameter $\rho_k$ in accordance with expression (4) is obtained. Similarly, also in (b) of FIG. 5, it is found that, in the case of determining the parameter $\rho_k$ in accordance with expression (10), when the number K of users is equal to the code length N=1024 or is close thereto, a bit error rate similar to that in the case of determining the parameter $\rho_k$ in accordance with expression (4) is obtained. However, in the case of determining the parameter $\rho_k$ in accordance with expression (10), when the number K of users is smaller than the code length N=128, the degree of reduction in the bit error rate becomes small.

The result shown in FIG. 5 shows equivalence between expression (4) and expression (10) in a case of K=N. According to the result shown in FIG. 5, it is found that, in the case of determining the parameter $\rho_k$ in accordance with expression (10), by making the code length N variable in accordance with the number K of users or the number K of channels, a bit error rate similar to that in the case of determining the parameter $\rho_k$ in accordance with expression (4) is obtained even though the parameter $\rho_k$ is determined in accordance with expression (10).

It is noted that, also in the case of determining the parameter $\rho_k$ in accordance with expression (4), K may be set to the maximum number of users or the maximum number of channels, instead of the actual number of users or number of channels. In this case, even if the actual number of users or number of channels varies during communication, K does not vary. Therefore, even in the case of determining the parameter $\rho_k$ in accordance with expression (4), a bit error rate similar to that in the case of determining the parameter $\rho_k$ in accordance with expression (10) is obtained.

[5. How to Use a Plurality of Almost Periodic Function Codes]

The modulator 20 performs modulation using a plurality of (K) almost periodic function codes $w_k[n]$. The symbol K is a number according to the number of users or the number of channels, and by using K codes $w_k[n]$, it is possible to modulate transmission signals for K users or K channels.

In a case of communication under an environment in which the number of users or the number of channels does not vary, K may be a constant. In this case, the modulator 20 uses all of the K almost periodic function codes $w_k[n]$ for modulation. However, the number of users or the number of channels often varies. Although the modulator 20 may change the value of K in expression (4) in accordance with the value of the number of users or the number of channels, K in expression (4) may be defined as the maximum number of users or the maximum number of channels (constant value). In this case, the modulator 20 selects L almost periodic function codes $w_k[n]$ according to the actual number L of users or number L of channels (L≤K), among the K almost periodic function codes $w_k[n]$ generated in advance, and uses the selected L almost periodic function codes $w_k[n]$ for modulation.

In addition, also in a case of setting the maximum number K of users or the maximum number K of channels to the code length N (K=N), the modulator 20 uses, for modulation, L almost periodic function codes $w_k[n]$ according to the actual number of users L or number of channels L (L≤K), among the N almost periodic function codes $w_k[n]$. The communication device 10 changes the code length N in accordance with the number K of users or the number K of channels that varies (N=K), and the modulator 20 can determine the N almost periodic function codes $w_k[n]$ on the basis of the changed code length N. In this case, the modulator 20 performs modulation using all of the N almost periodic function codes $w_k[n]$. It is noted that the maximum number K of users or the maximum number K of channels may be set to 2N. In addition, the communication device 10 may change the code length N to K/2 in accordance with the number K of users or the number K of channels that varies.

The plurality of almost periodic function codes $w_k[n]$ may be generated by a computer that the communication device 10 has, and may be stored in a storage device that the communication device 10 has. The plurality of almost periodic function codes $w_k[n]$ may be, in advance, generated by a computer separate from the communication device 10 and stored in a storage device that the communication device 10 has. The modulator 20 can select all or some of the plurality of almost periodic function codes $w_k[n]$ stored in the storage device, and use the selected codes for modulation.

The modulator 20 may use the almost periodic function code $w_k$ as a pseudo orthogonal multiplexing modulation code, instead of using as a spread code for spread spectrum communication. The pseudo orthogonal multiplexing modulation is modulation using the almost periodic function code $w_k$ and similar to orthogonal multiplexing modulation. Since the almost periodic function code $w_k$ is used, this modulation is not exactly orthogonal multiplexing modulation but becomes pseudo orthogonal multiplexing modulation.

In the pseudo orthogonal multiplexing modulation, a data symbol matrix (transmission signal) with a size of N×K is multiplied with a modulation matrix (pseudo orthogonal multiplexing modulation code matrix) with a size of K×N, whereby a modulated signal (pseudo orthogonal multiplexing modulated signal) that is a K×K matrix is outputted. The K×N modulation matrix is formed by arranging N almost periodic function codes $w_k[n]$ each having a code length N. In a case where, for example, the almost periodic function codes $w_k[n]$ are generated using the parameters $\rho_k$ determined in accordance with expression (10) (K=N), the modulation matrix becomes an N×N matrix.

REFERENCE SIGNS LIST 10 communication device
20 modulator

The invention claimed is:

1. A communication method using an almost periodic function code, the communication method comprising:
   using, for modulation, almost periodic function codes a number of which is in accordance with a number of users or a number of channels, among K almost periodic function codes, wherein
   a parameter that determines each of the K almost periodic function codes is represented by $\delta+(k-1)/K$,
   where k is an integer from 1 to K and is an identifier for identifying each of the K almost periodic function codes,
   K is N or 2N, where N is a code length of each almost periodic function code, and
   $\delta$ is a real number greater than 0 and less than 1/N, and $\delta$ is in a range of $\frac{1}{4}N \leq \delta \leq \frac{3}{4}N$.

2. The communication method according to claim 1, wherein $\delta$ is $\frac{1}{2}N$.

3. The communication method according to claim 2, wherein $\delta$ is a rational number.

4. The communication method according to claim 1, wherein $\delta$ is a rational number.

5. A communication method using an almost periodic function code, the communication method comprising:
   using, for modulation, almost periodic function codes a number of which is in accordance with a number of users or a number of channels, among K almost periodic function codes, wherein
   a parameter that determines each of the K almost periodic function codes is represented by $\delta+(k-1)/K$,
   where k is an integer from 1 to K and is an identifier for identifying each of the K almost periodic function codes,
   K is N or 2N, where N is a code length of each almost periodic function code, and
   $\delta$ is a real number greater than 0 and less than 1/N, and $\delta$ is in a range of $\frac{1}{8}N \leq \delta \leq \frac{3}{8}N$.

6. The communication method according to claim 5, wherein $\delta$ is $\frac{1}{4}N$.

7. The communication method according to claim 6, wherein $\delta$ is a rational number.

8. The communication method according to claim 5, wherein $\delta$ is a rational number.

9. A communication method using an almost periodic function code, the communication method comprising:
   using, for modulation, almost periodic function codes a number of which is in accordance with a number of users or a number of channels, among K almost periodic function codes, wherein
   a parameter that determines each of the K almost periodic function codes is represented by $\delta+(k-1)/K$,
   where k is an integer from 1 to K and is an identifier for identifying each of the K almost periodic function codes,
   K is N or 2N, where N is a code length of each almost periodic function code, and
   $\delta$ is in a range of $\frac{5}{8}N \leq \delta \leq \frac{7}{8}N$.

10. The communication method according to claim 9, wherein $\delta$ is $\frac{3}{4}N$.

11. The communication method according to claim 10, wherein $\delta$ is a rational number.

12. The communication method according to claim 9, wherein $\delta$ is a rational number.

13. A communication device performing communication using an almost periodic function code, the communication device comprising:
   a modulator configured to use, for modulation, almost periodic function codes a number of which is in accordance with a number of users or a number of channels, among K almost periodic function codes, wherein
   a parameter that determines each of the K almost periodic function codes is represented by $\delta+(k-1)/K$,
   where k is an integer from 1 to K and is an identifier for identifying each of the K almost periodic function codes,
   K is N or 2N, where N is a code length of each almost periodic function code, and
   $\delta$ is a real number greater than 0 and less than 1/N, and $\delta$ is in a range of $\frac{1}{4}N \leq \delta \leq \frac{3}{4}N$.

* * * * *